United States Patent
Kim et al.

(10) Patent No.: US 8,666,578 B2
(45) Date of Patent: Mar. 4, 2014

(54) METHOD AND SYSTEM FOR CUTTING FUEL FOR HYBRID VEHICLE

(75) Inventors: Sang Joon Kim, Seoul (KR); Kyu Hwan Jo, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/486,230

(22) Filed: Jun. 1, 2012

(65) Prior Publication Data

US 2012/0310457 A1     Dec. 6, 2012

(30) Foreign Application Priority Data

Jun. 1, 2011    (KR) ................ 10-2011-0052848

(51) Int. Cl.

| | |
|---|---|
| B60L 11/00 | (2006.01) |
| B60L 9/00 | (2006.01) |
| G06F 7/00 | (2006.01) |
| B60W 10/06 | (2006.01) |
| B60W 10/08 | (2006.01) |
| B60W 20/00 | (2006.01) |
| B60K 6/445 | (2007.10) |

(52) U.S. Cl.
CPC ............ *B60W 10/06* (2013.01); *B60W 10/08* (2013.01); *B60W 20/00* (2013.01); *B60K 6/445* (2013.01)
USPC ............................. 701/22; 701/123; 701/112

(58) Field of Classification Search
CPC .................................. B60L 9/00; B60L 11/00
USPC ............................................. 701/22, 99, 112
See application file for complete search history.

(56) References Cited

U.S. PATENT DOCUMENTS

| 6,166,449 A * | 12/2000 | Takaoka et al. ............ 290/40 B |
| 6,263,267 B1 * | 7/2001 | Anthony et al. ................ 701/22 |
| 6,278,195 B1 | 8/2001 | Yamaguchi et al. |
| 7,415,350 B2 * | 8/2008 | Nishikiori .................... 701/112 |
| 8,108,132 B2 * | 1/2012 | Reinke ......................... 701/111 |
| 2004/0134697 A1 * | 7/2004 | Kobayashi et al. ......... 180/65.2 |
| 2005/0197761 A1 * | 9/2005 | Bidner et al. ............... 701/105 |
| 2008/0262707 A1 * | 10/2008 | Yamaguchi .................. 701/112 |
| 2010/0036590 A1 * | 2/2010 | Nakai ........................... 701/112 |
| 2010/0125021 A1 * | 5/2010 | Matsubara et al. ............ 477/5 |
| 2010/0273593 A1 * | 10/2010 | Seo et al. ......................... 475/5 |
| 2011/0111906 A1 * | 5/2011 | Kim et al. ........................ 475/5 |
| 2012/0292919 A1 * | 11/2012 | Suzuki ........................ 290/38 C |
| 2012/0316715 A1 * | 12/2012 | Suzuki ........................... 701/22 |

FOREIGN PATENT DOCUMENTS

| JP | 11093724 A | 4/1999 |
| JP | 2007126092 A | 5/2007 |
| JP | 2008081099 A | 4/2008 |
| JP | 2009234359 A | 10/2009 |
| KR | 10-0253856 | 4/2000 |
| WO | 2007080729 A1 | 7/2007 |

* cited by examiner

*Primary Examiner* — Helal A Algahaim
*Assistant Examiner* — Angelina Shudy
(74) *Attorney, Agent, or Firm* — Edwards Wildman Palmer LLP; Peter F. Corless

(57) ABSTRACT

Disclosed is a method and a system for cutting fuel for a hybrid vehicle. More specifically, a control unit in the vehicle is configured to determine margin torque according to each driving mode, determine whether a current vehicle driving condition is a coasting driving condition, compare a engine torque and a sum of friction torque and the margin torque to determine whether the engine torque is greater than the sum of the friction torque and the margin torque and cut fuel injection to the engine when the engine torque is equal to or less than the sum of the friction torque and the margin torque.

20 Claims, 9 Drawing Sheets

METHOD AND SYSTEM FOR CUTTING FUEL FOR HYBRID VEHICLE

CROSS-REFERENCE TO RELATED APPLICATION

This application claims priority to and the benefit of Korean Patent Application No. 10-2011-0052848 filed in the Korean Intellectual Property Office on Jun. 1, 2011, the entire contents of which are incorporated herein by reference.

BACKGROUND OF THE INVENTION (a) Field of the Invention

The present invention relates to a method and a system for cutting fuel for a hybrid vehicle.

(b) Description of the Related Art

A hybrid vehicle is defined as using two or more different power sources to efficiently drive a vehicle. Generally, hybrid vehicles include an engine generating torque by combusting fuel and a motor operated by a battery. Recently, hybrid vehicles have been developed and attracted attention in regards to their enhanced fuel economy and their reduced effects on the environment.

Hybrid vehicles often run in various modes (e.g., an electric vehicle mode, a hybrid mode, an engine mode, a regenerative braking (RB) mode, and so on) depending on a driving condition thereof. In the electric vehicle mode, the driving torque is generated only by the motor. In the hybrid mode, the driving torque is generated by the motor and the engine, and in the engine mode, the driving torque is generated only by the engine. In the regenerative braking mode, electrical energy is generated by the inertia from a vehicle and used to charge a battery for powering the motor. Accordingly, hybrid vehicles may use the mechanical energy of an engine, the electrical energy of a battery and may regenerate electrical energy from braking and thus may enhance fuel consumption.

FIG. 1 is a schematic diagram of a conventional transmission system (flexible hybrid system, FHS) of a hybrid vehicle. The system may realize two EVT (electrical variable transmission) modes and three FG (fixed gear) modes.

Referring to FIG. 1, the system includes an engine 10, a first planetary gear unit 20, a second planetary gear unit 30, a first motor/generator (MG1) 51, a second motor/generator (MG2) 52, a first clutch CL1, a second clutch CL2, a first brake BK1, a second brake BK2, and a transmission output shaft 80. The first planetary gear unit 20 includes a first sun gear S1, a first carrier C1, and a first ring gear R1. The second planetary gear unit 30 includes a second sun gear S2, a second carrier C2, and a second ring gear R2.

The engine 10 is connected to the first carrier C1, and the engine 10 rotates the first carrier C1 around the first sun gear S1. The first motor/generator 51 is disposed to rotate the first ring gear R1. The first brake BK1 selectively stops rotation of the first ring gear R1.

The first sun gear S1 and the second sun gear S2 are continuously connected to rotate together, and the second motor/generator 52 rotates the first and second sun gears S1 and S2.

The first clutch CL1 selectively connects the first carrier C1 with the first ring gear R1, and the second clutch CL2 selectively connects the first carrier C1 with the second ring gear R2. Furthermore, if both CL1 and CL2 are engaged, the first carrier C1 and the first R1 are connected to the second ring gear R2.

The second brake BK2 is disposed to selectively stop rotation of the second ring gear R2. The second carrier C2 is directly connected to the output shaft 80 of the transmission, and transfers output torque of the engine 10, the first motor/generator 51, and the second motor/generator 52 to the wheels.

In the transmission system, as shown in FIG. 1, when a vehicle starts or drives at a low speed, only the motor/generator 51 and 52 generate driving torque because generally engine efficiency is less than efficiency of the motor/generator 51 and 52 in a starting condition or in low speed driving. Thus, in a starting condition, fuel efficiency may be enhanced using the motor/generator 51 and 52 without operating the engine 10. After the vehicle begins moving, an ISG (Integrated start generator) starts the engine 10 and thus engine output and the motor/generator 51 and 52 output may be used simultaneously.

During braking, a hybrid vehicle may be operated in a regenerative braking mode as shown in FIG. 3. In this case, the second motor/generator 52 may generate inverse direction torque (charging torque) and thus electrical energy may be regenerated to the battery 70. That is, the second motor/generator 52 charges a battery 70 using the inertia of a vehicle. In this case, the charging torque is defined as the opposite direction torque of the second motor/generator 52 against a driving direction of a vehicle.

FIG. 2 is a graph illustrating the relationship between the vehicle speed of the vehicle and the torque when an accelerator pedal is not pushed (i.e., when a signal of an APS (accelerator-pedal position sensor) is "0"). In the drawing, the relationship of the vehicle speed and torque is shown for coasting driving.

When the vehicle is coasting (i.e., a driver is not pushing an accelerator pedal) in a general gasoline vehicle, a vehicle is operated by inertia of an engine and inertia torque (coasting torque) is applied to the engine. However, in the hybrid transmission system as shown in FIG. 1, for charging the battery 70 using driving torque of a vehicle in a coasting driving condition, the engine 10 is stopped and the second motor/generator 52 generates charging torque corresponding to the inertia torque which generated due to the inertia of the vehicle.

Accordingly, it is important to determine when to cut fuel to the engine when changing driving modes since fuel cutting time may influence drivability.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and a system for cutting fuel to an engine in a hybrid vehicle having advantages of providing different fuel cutting times according to a current driving mode while the vehicle is coasting.

A method for cutting fuel for a hybrid vehicle including an engine and first and second motor/generators as power sources according to an exemplary embodiment of the present invention is provided. More specifically, the method may include determining, by a control unit, a margin torque according to each driving mode, determining, by the control unit, when a current vehicle driving condition is satisfied for a coasting driving condition, comparing, by the control unit, engine torque and a sum of friction torque and the margin torque to determine whether the engine torque is greater than the sum of the friction torque and the margin torque, and cutting fuel injection to the engine, by the control unit, when the engine torque is equal to or less than the sum of the friction torque and the margin torque. Additionally, fuel injection may be maintained when the engine torque is greater than the sum of the friction torque and the margin torque.

The margin torque may be determined based on influence of the engine torque to output torque. More specifically, the margin torque may be in inverse proportion to the influence of the engine torque to the output torque.

Charging torque may be generated by the second motor/generator corresponding to the coasting torque when the fuel injection is cut. Furthermore, in some embodiments the charging torque of the second motor/generator may be generated by the discharging torque of the first motor/generator.

Discharging torque may generated by the first motor/generator in order to drive the engine, and charging torque may be generated by the second motor/generator when the fuel injection is cut.

A system for cutting fuel for a hybrid vehicle including an engine and first and second motor/generators as power sources according to an exemplary embodiment of the present invention is provided. More specifically, the system may include a first planetary gear unit including a first sun gear, a first ring gear connected with the first motor/generator, and a first carrier connected with the engine, a second planetary gear unit including a second sun gear, a second sun gear connected with the second motor/generator and the first sun gear, and a second carrier transferring output torque to an output shaft, a first brake selectively stopping rotation of the first motor/generator and the first ring gear, a first clutch selectively engaging/connecting the first carrier with the first ring gear, a second clutch selectively engaging/connecting the first carrier with the second ring gear, and a second brake selectively stopping rotation of the second ring gear.

A battery electrically may be connected with the first and second motor/generators, and an accelerator pedal position sensor may be configured to detect a position of an accelerator pedal. Likewise, a brake pedal position sensor may be configured to detect a position of a brake pedal. A state of charge (SOC) detector may be configured to detect SOC of the battery, and a vehicle speed detector may be configured to detect the speed of the vehicle.

A control unit may be configured to receive corresponding signals from the accelerator pedal position sensor, brake pedal position sensor, SOC detector, and vehicle speed detector, and control operations of the engine and the first and second motor/generators. The control unit may determine margin torque according to each driving mode, determine whether a current vehicle driving condition is satisfied for a coasting driving condition, compare engine torque and a sum of friction torque and the margin torque to determine whether the engine torque is greater than the sum of the friction torque and the margin torque, and control the engine to stop fuel injection when the engine torque is equal to or less than the sum of the friction torque and the margin torque. Alternatively, the control unit may control the engine to maintain fuel injection when the engine torque is greater than the sum of the friction torque and the margin torque.

The control unit may also be configured to determine the margin torque based on influence of the engine torque to the output torque. More specifically, the margin torque may be in inverse proportion to the influence of the engine torque to the output torque.

The control unit may control the first motor/generator to generate discharging torque in order to drive the engine, and control the second motor/generator to generate charging torque when the fuel injection is cut. The charging torque of the second motor/generator may be generated by the discharging torque of the first motor/generator.

The control unit may control the engine to stop and control the second motor/generator to generate charging torque corresponding to coasting torque when the battery is allowed to be additionally charged.

Advantageously, since fuel injection may be stopped when the engine torque is equal to or less than the sum of the engine friction torque and the margin torque, fuel efficiency may be enhanced beyond that of conventional hybrid systems. Also, according to an exemplary embodiment of the present invention, since the margin torque may be determined based on the current mode, the fuel cutting time may be varied so that fuel efficiency may be enhanced.

DESCRIPTION OF SYMBOLS

Figure 1:
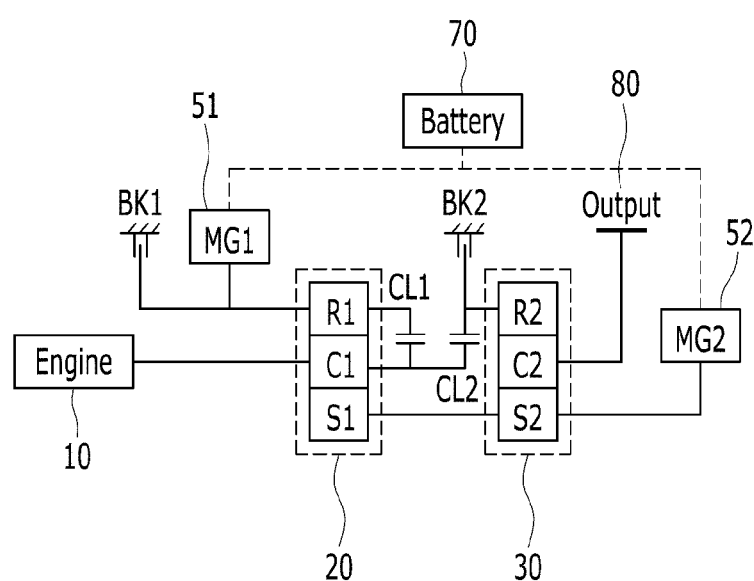
FIG. 1 is a schematic diagram of a conventional transmission system of a hybrid vehicle which may be applied to a method and a system for cutting fuel according to an exemplary embodiment of the present invention.
Figure 2:
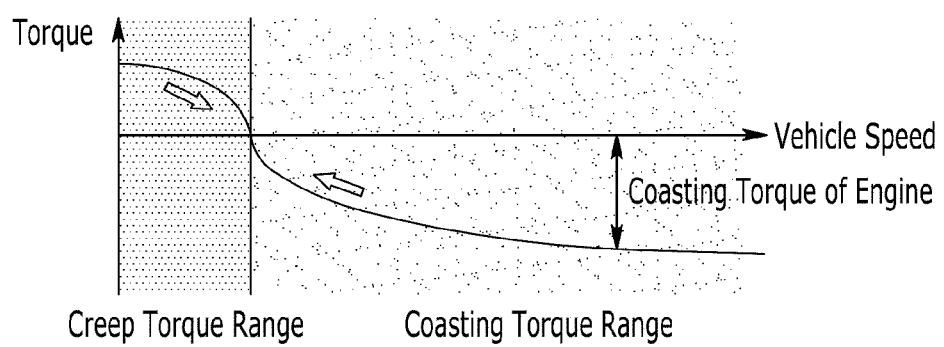
FIG. 2 is a graph illustrating a relationship of vehicle speed and torque when an accelerator pedal is not pushed.

10: engine
20: first planetary gear set
30: second planetary gear set
51: first motor/generator
52: second motor/generator
70: battery
80: output shaft

DETAILED DESCRIPTION OF THE EMBODIMENTS

An exemplary embodiment of the present invention will hereinafter be described in detail with reference to the accompanying drawings.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although the above exemplary embodiment is described as using a single control unit to perform the above process, it is understood that the above processes may also be performed by a plurality of controllers or control units which executes control logic.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

FIG. 1 is a schematic diagram of a conventional transmission system (flexible hybrid system, FHS) of a hybrid vehicle. The system may realize two EVT (electrical variable transmission) modes and three FG (fixed gear) modes.

Referring to FIG. 1, the system includes an engine 10, a first planetary gear unit 20, a second planetary gear unit 30, a first motor/generator (MG1) 51, a second motor/generator (MG2) 52, a first clutch CL1, a second clutch CL2, a first brake BK1, a second brake BK2, and a transmission output shaft 80. The first planetary gear unit 20 includes a first sun gear S1, a first carrier C1, and a first ring gear R1. The second planetary gear unit 30 includes a second sun gear S2, a second carrier C2, and a second ring gear R2.

The engine 10 is connected to the first carrier C1, and the engine 10 rotates the first carrier C1 around the first sun gear S1. The first motor/generator 51 is disposed to rotate the first ring gear R1. The first brake BK1 selectively stops rotation of the first ring gear R1.

The first sun gear S1 and the second sun gear S2 are continuously connected to rotate together, and the second motor/generator 52 rotates the first and second sun gears S1 and S2.

The first clutch CL1 selectively connects the first carrier C1 with the first ring gear R1, and the second clutch CL2 selectively connects the first carrier C1 with the second ring gear R2. Furthermore, if both CL1 and CL2 are engaged, the first carrier C1 and the first R1 are connected to the second ring gear R2.

The second brake BK2 is disposed to selectively stop rotation of the second ring gear R2. The second carrier C2 is directly connected to the output shaft 80 of the transmission, and transfers output torque of the engine 10, the first motor/generator 51, and the second motor/generator 52 to the wheels.

In the transmission system, as shown in FIG. 1, when a vehicle starts or drives at a low speed, only the motor/generator 51 and 52 generate driving torque because generally engine efficiency is less than efficiency of the motor/generator 51 and 52 in a starting condition or in low speed driving.

Thus, in a starting condition, fuel efficiency may be enhanced using the motor/generator 51 and 52 without operating the engine 10. After the vehicle begins moving, an ISG (Integrated start generator) starts the engine 10 and thus engine output and the motor/generator 51 and 52 output may be used simultaneously.

Figure 8:
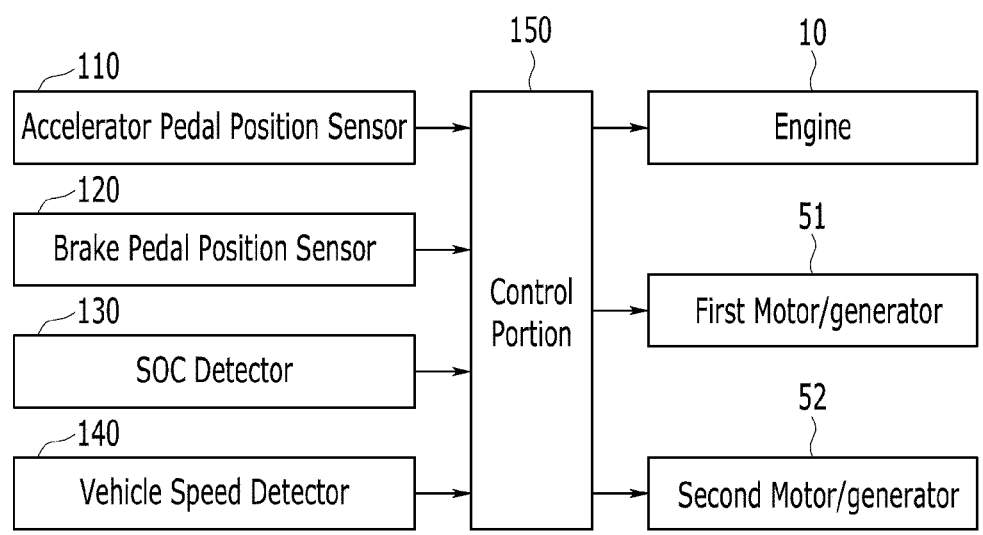
FIG. 8 is a block diagram of a system for cutting fuel for a hybrid vehicle according to an exemplary embodiment of the present invention.

FIG. 8 is a block diagram of a system for cutting fuel for hybrid vehicle according to an exemplary embodiment of the present invention.

A hybrid vehicle to which a method for cutting fuel according to an exemplary embodiment of the present invention may be applied includes at least one engine 10 and the first and second motor/generators 51 and 52. The hybrid vehicle may identify a hybrid mode in which the engine 10 and the first and second motor/generators 51 and 52 are operated in simultaneously.

As shown in FIG. 8, a fuel cutting system for a hybrid vehicle according to an exemplary embodiment of the present invention may include an accelerator pedal position sensor 110, a brake pedal position sensor 120, a state of charge (SOC) detector 130, a vehicle speed detector 140, and a control unit 150.

The accelerator pedal position detector 110 may detect a position of an accelerator pedal (pushed degree of the accelerator pedal) and delivers a signal corresponding thereto to the control unit 150. When the accelerator pedal is pushed completely the position of the accelerator pedal is 100%, and when the accelerator pedal is not pushed at all the position of the accelerator pedal is 0%. A throttle valve opening sensor installed at an intake passage may be used instead of the accelerator pedal position detector 110. Therefore, it is to be understood that the accelerator pedal position detector 110 includes the throttle valve opening sensor and the position of the accelerator pedal includes an opening of a throttle valve in this specification.

The brake pedal position detector 120 may detect a position of a brake pedal (e.g., of the amount the brake pedal is currently being pushed) and delivers a signal corresponding thereto to the control unit 150. When the brake pedal is pushed completely the position of the brake pedal is 100%, and when the brake pedal is not pushed the position of the brake pedal is 0%.

The state of charge (SOC) detector 130 detects the SOC of a battery and delivers a signal corresponding thereto to the control unit 150. Instead of directly detecting the SOC of the battery 70, current and voltage of the battery 70 may be detected and the SOC of the battery 70 may be estimated based thereon.

The vehicle speed detector 140 is installed at a wheel of the vehicle, detects the current speed of the vehicle, and delivers a signal corresponding thereto to the control unit 150.

A maximum torque that can be output by the engine 10, a maximum torque that can be output by the first and second motor/generators 51 and 52, and creep torque (i.e., the sum of an engine torque and motor torque of the first and second motor/generators 51 and 52) enabling creep driving of the vehicle are stored in the control unit 150 in e.g. a memory or a hard drive.

The control unit 150 calculates an acceleration torque by using the position of the accelerator pedal, the minimum torque, and the maximum torque of the vehicle, and calculates an engine division torque and a motor division torque which the engine 10 and the first and second motor/generators 51 and 52 should respectively output.

In the exemplary embodiment of the present invention, when the vehicle speed is greater than a predetermined value (e.g., more than 30 km/h) and the brake pedal and the acceleration pedal are not pushed completely so that vehicle speed is gradually reduced (in coasting driving), the engine 10 is controlled to satisfy coasting torque (inertia torque) using the driving torque of the vehicle to charge the battery 70. Particularly, the method and the system for cutting fuel for a hybrid vehicle according to an exemplary embodiment of the present invention enhances the fuel efficiency by varying the fuel injection cutting time according to the current driving mode in the passive run condition of which charging of the battery is limited.

In this case, the second motor/generator 52 generates charging torque corresponding to the discharging torque of the first motor/generator 51, and resultantly torque corresponding to the torque of the coasting driving condition may be transmitted to the output shaft 80.

As discussed above it is beneficial to determine accurately when to cut fuel to the engine when changing driving modes from one in which fuel injection is maintained to the coasting driving mode, because fuel cutting time may influence drivability.

For this purpose, in an exemplary embodiment of the present invention, the control unit 150 determines margin torque according to each driving mode and then detects signals of the APS (accelerator pedal position sensor) 110 to determine if the value is "0".

When the control unit 150 detects an off state of the APS, that is, the corresponding signal is "0", the control unit 150 controls the second motor/generator 52 to generate the charging torque. If the battery 70 is not allowed to be charged, the control unit 150 controls operations of the engine 10 and the first and second motor/generators 51 and 52.

In the conventional art, when engine torque is equal to friction torque of the engine, fuel injection is stopped. This is because, if the engine torque is greater than the friction torque and the fuel injection is cut, a power shock may occur thus effecting the drivability of the vehicle.

However, in the exemplary embodiment of the present invention, the fuel cutting time may be varied considering the friction torque and margin torque of which the torque range does not influence drivability according to the current driving mode. That is, the control unit 150 stops fuel injection when the engine torque is equal to the predetermined margin torque and the predetermined engine friction torque to reduce fuel consumption.

Thus, the fuel cutting time may be varied according to the current driving mode, and thus may in some instances cut fuel to the engine prior to conventional method and thus fuel efficiency may be enhanced.

In this case, the friction torque may be determined by experimental data or determined based on vehicle driving conditions, e.g., engine oil temperature, atmospheric pressure, atmospheric temperature, and so on.

The influence of the engine torque on the output torque transmitted to the output shaft 80 may be varied according to the driving mode of the transmission system, because the influence of the engine torque according to the driving mode may be varied due to various gear ratios ($R_1$ or $R_2$) of each driving mode. In this case, the gear ratio R is denoted as ring gear/sun gear tooth ratios. The margin torque may be in inverse proportion to the influence of the engine torque to the output torque.

Hereinafter, the margin torque according to each driving mode will be described referring to the transmission system as shown in FIG. 1.

The transmission system as shown in FIG. 1 may realize an EVT1 mode in which the second brake BK2 is engaged, an EVT2 mode in which the second clutch CL2 is engaged, an FG1 mode in which the second brake BK2 and the first clutch CL1 are engaged, an FG2 mode in which the first clutch CL1 and the second clutch CL2 are engaged, and an FG3 mode in which the second clutch CL2 and the first brake BK1 are engaged.

Figure 3:
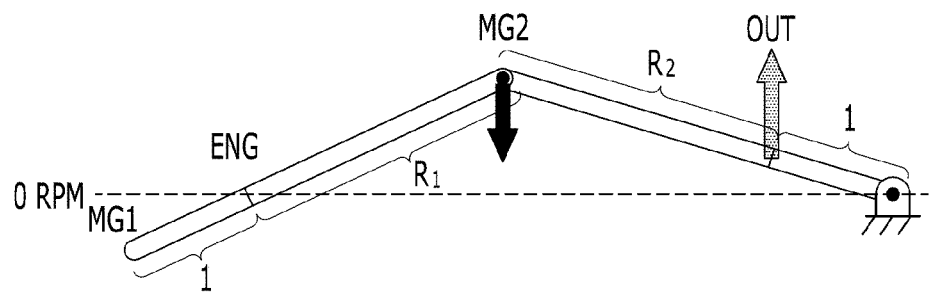
FIG. 3 is a lever diagram of a general EVT1 mode in a coasting driving condition.

FIG. 5 is a lever diagram of FG modes FG1, FG2, and FG3 to which the method for fuel cutting for hybrid vehicle according to an exemplary embodiment of the present invention is applied. In FIGS. 3 to 5, arrows indicate corresponding torque at each point.

Figure 5A:
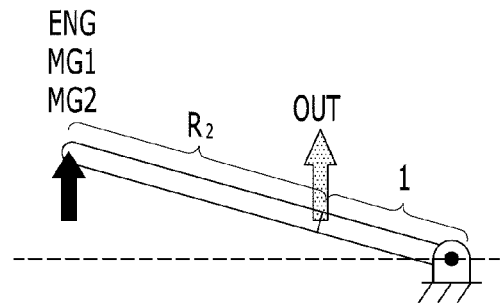
FIG. 5A-5C shows lever diagrams of an FG mode of which a method for cutting fuel for a hybrid vehicle according to an exemplary embodiment of the present invention is applied.

In the FG1 mode as shown in FIG. 5A, the second brake and the first clutch are engaged, and the relationship of the output torque $T_{out}$ and the engine torque $T_{eng}$ may be described as follows.

$$(1+R_2)T_{eng} = T_{out} \qquad \text{[Equation 1]}$$

In this case, $1+R_2$ refers to the influence of the engine torque on output torque, and it may be noted that the output torque $T_{out}$ is larger than the engine torque $T_{eng}$ from the relationship.

The margin torque, as described above, refers to torque ranges which may not influence drivability of the vehicle and may be described as follows.

margin torque=(1/influence of engine torque)*margin torque standard value

Since the margin torque refers to torque ranges which may not influence drivability of the vehicle, the margin torque may be reduced as the influence of the engine torque on the output torque is increased. That is, the margin torque is in inverse proportion to the influence of the engine torque on the output torque. Therefore, as the influence of the engine torque on the output torque is increased, the value of the margin torque is decreased. On the other hand, as the influence of the engine torque on the output torque is decreased, the value of the margin torque is increased.

Thus, in FIG. 5A, the margin torque will be $\{1/(1+R_2)\}$*margin torque standard value. In this case, the margin torque standard value may be determined according to a transmission system and may be obtained as noted above through experimental data.

Figure 5B:
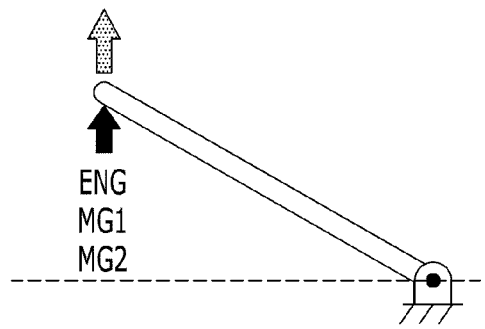

In the FG2 mode as shown in FIG. 5B, the first clutch CL1 and the second clutch CL2 are engaged, and the relationship of the output torque $T_{out}$ and the engine torque $T_{eng}$ may be described as $T_{eng}=T_{out}$, thus the margin torque in the FG2 mode is the same value as the margin torque standard value. That is, the influence of the engine torque to output torque may be "1". That means that all of the engine torque is transferred to output torque.

Figure 5C:
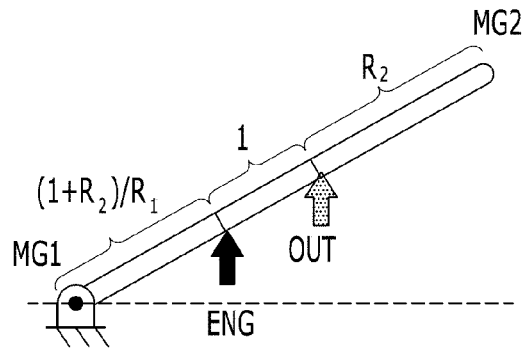

In the FG3 mode as shown in FIG. 5C, the second clutch CL2 and the first brake BK1 are engaged, and the relationship of the output torque $T_{out}$ and the engine torque $T_{eng}$ may be described as $((1+R_2)/(1+R1+R_2))T_{eng}=T_{out}$, thus in FIG. 5C, the margin torque will be $(1+R1+R2)/(1+R2)\}$*margin torque standard value. That is, the influence of the engine torque to output torque may be $(1+R2)/(1+R1+R2)$. In this case, the output torque will be less than the engine torque.

Figure 4A:
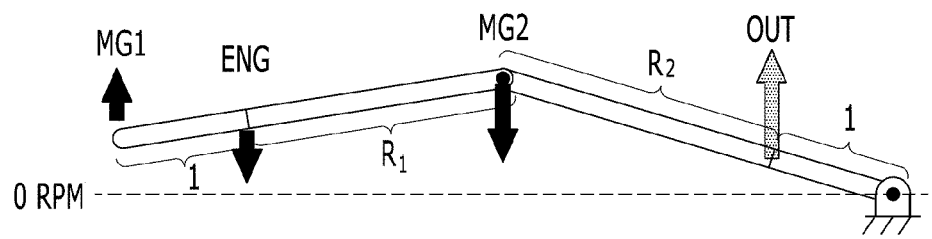
FIGS. 4a and 4b are lever diagrams of EVT1 and EVT2 modes of which a method for cutting fuel for hybrid vehicle according to an exemplary embodiment of the present invention is applied.
Figure 4B:
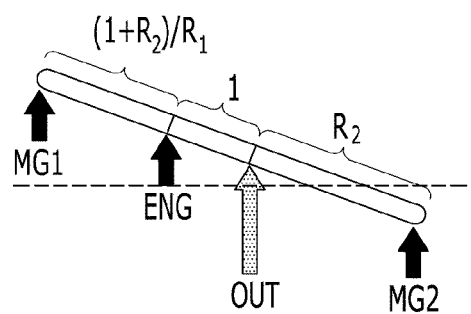

In FIG. 4, lever diagrams of the EVT1 and EVT2 modes of which a method for cutting fuel for a hybrid vehicle according to an exemplary embodiment of the present invention is applied are shown. In the EVT1 mode, the relationship of the output torque $T_{out}$ and the engine torque Teng may be described as $\{(1+R2)/(1+R1)\}$Teng=$T_{out}$. Thus, in FIG. 4A, the margin torque will be $\{(1+R1)/(1+R2)\}$*margin torque standard value.

However, in the EVT2 mode, brakes are not engaged, and thus the influence of the engine torque to output torque may be varied according to the engine division torque and the motor division torque which the engine 10 and the first and second motor/generators 51 and 52 should respectively output. Therefore, the margin torque may be varied according to the motor division torques which the first and second motor/generators 51 and 52 should respectively output, and the margin torque may be determined by a map of which the motor division torques of the first and second motor/generators 51 and 52 are stored, and detailed description will be omitted.

As described above, the margin torque according to each driving mode, and thus fuel cutting time, may be varied. This will be described referring to FIG. 6, thus preventing drivability from being effected.

Figure 6:
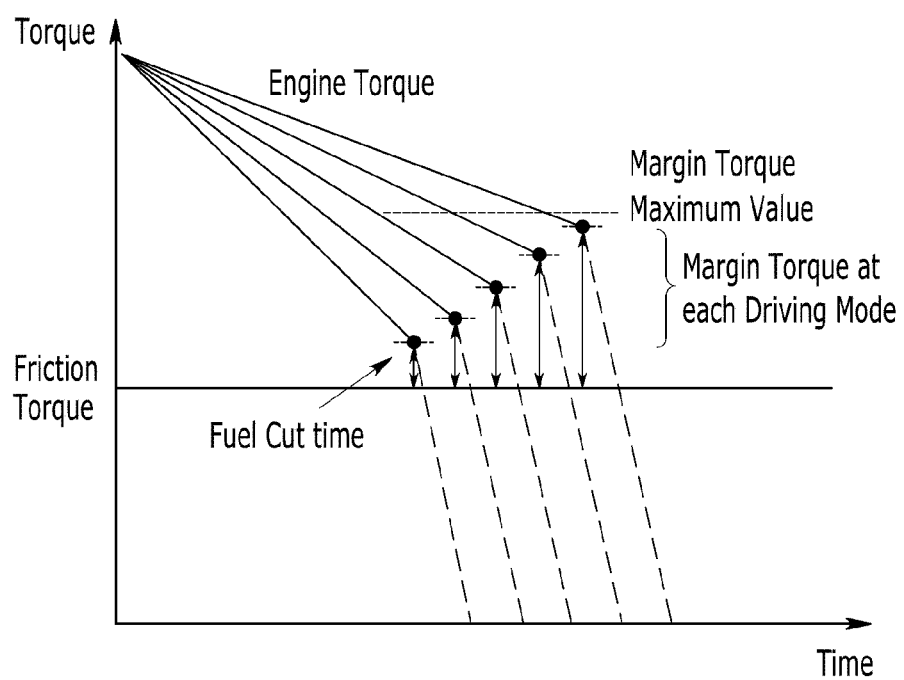
FIG. 6 is a graph illustrating various fuel cutting times according to a current driving mode of a vehicle of which a method for cutting fuel for a hybrid vehicle according to an exemplary embodiment of the present invention is applied.

FIG. 6 is a graph illustrating various fuel cutting times according to a current driving mode of a vehicle of which a method for fuel cutting for a hybrid vehicle according to an exemplary embodiment of the present invention is applied. In a conventional art, fuel injection is stopped when engine torque is equal to engine friction torque. However, in the method for cutting fuel for a hybrid vehicle according to the exemplary embodiment of the present invention, fuel injection is cut (stopped) when the engine torque is equal to or less than a sum of the engine friction torque and the margin torque according to the current driving mode, and thus fuel cutting time may be advanced. That is, since the margin torque may be varied according to the current driving mode, fuel cutting time may be varied according to the current driving mode. Further, fuel cutting time occurs in proportion to the value of the margin torque.

As described above, due to the various fuel cutting times according to the current driving mode, fuel consumption may be reduced. That is, the margin torque may be less than a predetermined margin torque maximum value. Thus, the fuel cutting time may not consistently initiate based on a predetermined margin torque. Instead, the margin torque may be limited by the predetermined margin torque maximum value which may not influence the drivability.

In this case, the first motor/generator 51 generates the friction torque to drive the engine 10 and the charging torque is generated by the second motor/generator 52. The values of the friction torque and the charging torque may be the same.

If charging of the battery is possible, the engine 10 is stopped and the second motor/generator 52 may generate the charging torque corresponding to the coasting torque. If charging of the battery is not possible, the control unit 150 controls the first motor/generator 51 to drive the engine 10 by the driving torque of the first motor/generator 51 without fuel consumption and thus the friction torque is generated to the engine 10 and transmitted to the output shaft 80 to provide coasting torque. In this case, the control unit 150 controls the second motor/generator 52 to be operated as a generator.

When the engine torque is greater than the sum of the predetermined margin torque and the engine friction torque, fuel injection is maintained to prevent the engine from stopping. After that, fuel injection is cut when the engine torque is the same or less than the sum of the margin torque and the engine friction torque.

Figure 7:
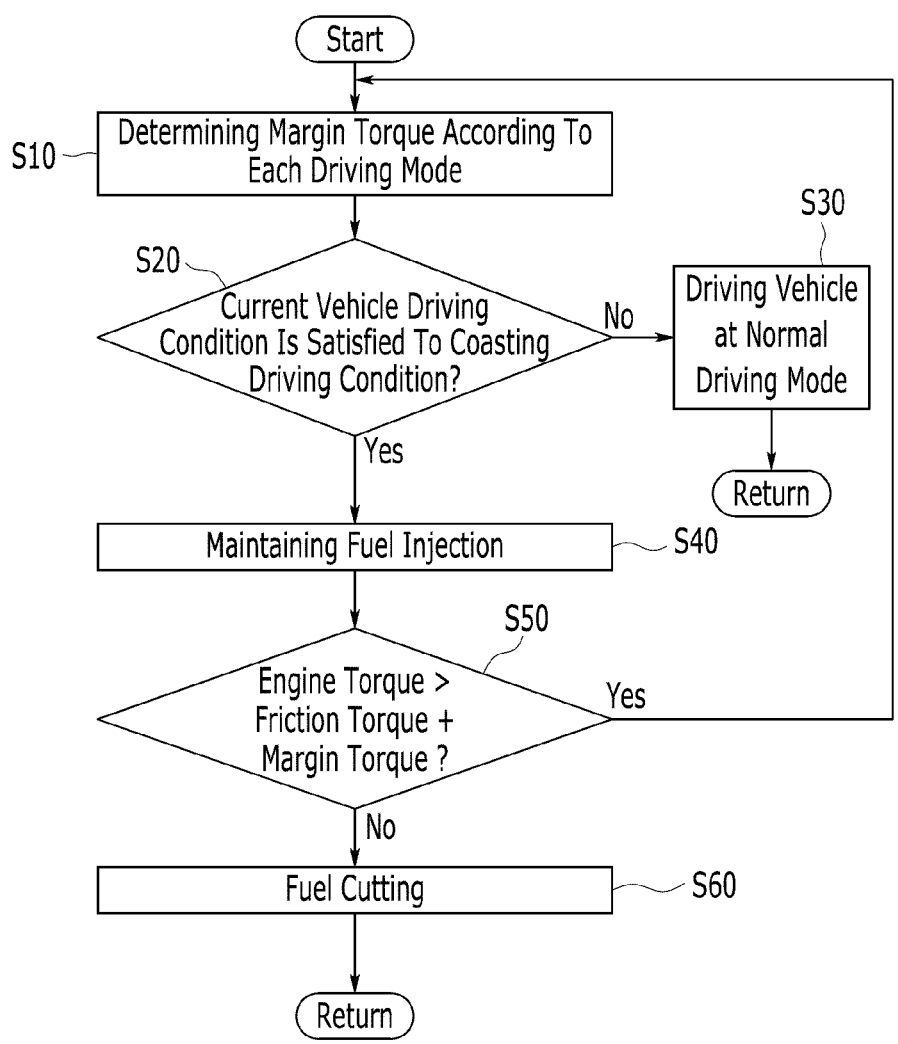
FIG. 7 is a flowchart of a method for cutting fuel for a hybrid vehicle according to an exemplary embodiment of the present invention.

Hereinafter, referring to FIG. 7, the fuel cutting method according to the exemplary embodiment of the present invention will be described.

The control unit 150 determines the margin torque according to each driving mode at a step S10. The determination of the margin torque according to each driving mode is described above and thus a detailed description will be omitted. In this case, the margin torque may be a predetermined value.

The control unit 150 determines whether current vehicle driving conditions are satisfied for the coasting driving condition at a step S20. The coasting driving condition may be identified based on a when the corresponding signal of the APS 110 is "0", the corresponding signal of the brake pedal position sensor 120 is "0", and the corresponding signal of the vehicle speed detector 140 is within a range where EV driving speed range or the corresponding signal of the vehicle speed detector 140 is greater than a coasting torque speed limitation wherein the coasting torque is changed to negative. In the exemplary embodiment of the present invention, the method and the system may be applied only to the condition where the engine 10 maintains fuel injection.

In this case, the EV driving speed range may be defined as speed limits which are limited by a motor output limitation. And the coasting torque speed limitation may be defined as a speed where the coasting torque translates from positive to negative, for example, the coasting torque speed limitation may be about 10 Km/h in most hybrid vehicles.

When the driving condition of the vehicle does not satisfy the coasting driving condition, the control unit 150 controls the engine 10 and the first and second motor/generators 51 and 52 for the vehicle to be driven as a normal driving condition (which is not coasting driving) at a step S30. If the driving condition of the vehicle satisfies the coasting driving condition, the control unit 150 maintains fuel injection to the engine 10 at a step S40.

The control unit 150 compares the engine torque and the sum of the friction torque and the margin torque to determine whether the engine torque is greater than the sum of the friction torque and the margin torque at s step S50. The control unit 150 cuts fuel injection when the engine torque is equal to or less than the sum of the friction torque and the margin torque at a step S60.

If charging of the battery is possible in the coasting driving, the engine 10 is stopped and the second motor/generator 52 may generate the charging torque corresponding to the coasting torque. If charging of the battery is not possible in the coasting driving, the control unit 150 controls the first motor/generator 51 to drive the engine 10 by the driving torque of the first motor/generator 51 without fuel consumption and thus the friction torque is generated to the engine 10 and transmitted to the output shaft 80 so as to satisfy the coasting torque requirement. The control unit 150 then controls the second motor/generator 52 to be operated as a generator.

In the detailed description, the transmission system as shown in FIG. 1 is described as an exemplary embodiment of the present invention. However, it is not limited thereto; on the contrary the method according to the exemplary embodiment of the present invention may cover hybrid vehicles with more than two motor/generators.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for cutting fuel for a hybrid vehicle including an engine and first and second motor/generators as power sources, the method comprising:
   determining, by a control unit, a margin torque according to each driving mode;
   determining, by a control unit, when a current vehicle driving condition is a coasting driving condition;

comparing, by the control unit, an engine torque and a sum of friction torque and the margin torque to determine whether the engine torque is greater than the sum of the friction torque and the margin torque; and cutting fuel injection to the engine, by the control unit, when the engine torque is equal to or less than the sum of the friction torque and the margin torque.

2. The method of claim 1, wherein the margin torque is determined based on influence of the engine torque to output torque.

3. The method of claim 2, wherein the margin torque is in inverse proportion to the influence of the engine torque to the output torque.

4. The method of claim 1, wherein charging torque is generated by the second motor/generator corresponding to the torque when the fuel injection is cut.

5. The method of claim 1, wherein discharging torque is generated by the first motor/generator in order to drive the engine and charging torque is generated by the second motor/generator when the fuel injection is cut.

6. The method of claim 5, wherein the charging torque of the second motor/generator is generated by the discharging torque of the first motor/generator.

7. The method of claim 1, wherein the fuel injection is maintained when the engine torque is greater than the sum of the friction torque and the margin torque.

8. A system for cutting fuel for a hybrid vehicle including an engine and first and second motor/generators as power sources, the system comprising:

a first planetary gear unit comprising a first sun gear, a first ring gear connected with the first motor/generator, and a first carrier connected with the engine;

a second planetary gear unit comprising a second sun gear, a second sun gear connected with the second motor/generator and the first sun gear, and a second carrier transferring output torque to an output shaft;

a first brake selectively stopping rotation of the first motor/generator and the first ring gear;

a first clutch selectively connecting the first carrier with the first ring gear;

a second clutch selectively connecting the first carrier with the second ring gear;

a second brake selectively configured to stop rotation of the second ring gear;

a battery electrically connected with the first and second motor/generators;

an accelerator pedal position sensor configured to detect a position of an accelerator pedal;

a brake pedal position sensor configured to detect a position of a brake pedal;

a state of charge (SOC) detector configured to detect a SOC of the battery;

a vehicle speed detector configured to detect a vehicle speed; and a control unit configured to receive corresponding signals from the accelerator pedal position sensor, brake pedal position sensor, SOC detector, and vehicle speed detector, and controls operations of the engine and the first and second motor/generators, determine margin torque according to each driving mode, determine whether a current vehicle driving condition is a coasting driving condition, compare a engine torque and a sum of friction torque and the margin torque to determine whether the engine torque is greater than the sum of the friction torque and the margin torque, and stop fuel injection to the engine when the engine torque is equal to or less than the sum of the friction torque and the margin torque.

9. The system of claim 8, wherein the control unit determines the margin torque based on influence of the engine torque to the output torque.

10. The system of claim 9, wherein the margin torque is in inverse proportion to the influence of the engine torque to the output torque.

11. The system of claim 8, wherein the control unit controls the first motor/generator to generate discharging torque in order to drive the engine, and controls the second motor/generator to generate charging torque when the fuel injection is cut.

12. The system of claim 11, wherein the charging torque of the second motor/generator is generated by the discharging torque of the first motor/generator.

13. The system of claim 8, wherein the control unit controls the engine to stop and controls the second motor/generator to generate charging torque corresponding to coasting torque when the battery is allowed to be charged additionally.

14. The system of claim 8, wherein the control unit controls the engine to maintain fuel injection when the engine torque is greater than the sum of the friction torque and the margin torque.

15. A non-transitory computer readable medium containing program instructions executed by a processor or controller, the computer readable medium comprising:

program instructions that determine a margin torque according to each driving mode;

program instructions that determine when a current vehicle driving condition is a coasting driving condition;

program instructions that compare an engine torque and a sum of friction torque and a margin torque to determine whether the engine torque is greater than the sum of the friction torque and the margin torque; and program instructions that cuts fuel injection to the engine when the engine torque is equal to or less than the sum of the friction torque and the margin torque.

16. A control unit for a hybrid vehicle, the controller configured to:

determine a margin torque according to each driving mode, determine when a current vehicle driving condition is a coasting driving condition;

compare an engine torque and a sum of friction torque and a margin torque to determine whether the engine torque is greater than the sum of the friction torque and the margin torque; and cut fuel injection to the engine when the engine torque is equal to or less than the sum of the friction torque and the margin torque.

17. The control unit of claim 16, wherein the controller determines the margin torque based on influence of the engine torque to the output torque.

18. The control unit of claim 17, wherein the margin torque is in inverse proportion to the influence of the engine torque to the output torque.

19. The control unit of claim 16, wherein the control unit controls the first motor/generator to generate discharging torque in order to drive the engine, and controls the second motor/generator to generate charging torque when the fuel injection is cut.

20. The control unit of claim 19, wherein the charging torque of the second motor/generator is generated by the discharging torque of the first motor/generator.

* * * * *